US006468086B1

(12) United States Patent
Brady-Koontz

(10) Patent No.: US 6,468,086 B1
(45) Date of Patent: Oct. 22, 2002

(54) METHOD OF DISPLAY OF VIDEO IMAGES OF EXERCISES

(76) Inventor: Shelly Brady-Koontz, 2134 S. Cincinnati, Tulsa, OK (US) 74114

( * ) Notice: Subject to any disclaimer, the term of this patent is extended or adjusted under 35 U.S.C. 154(b) by 101 days.

(21) Appl. No.: 09/609,465

(22) Filed: Jul. 3, 2000

(51) Int. Cl.7 ............................................... G09B 19/00
(52) U.S. Cl. ...................................................... 434/257
(58) Field of Search ................................. 434/247, 250, 434/252, 257, 258

(56) References Cited

U.S. PATENT DOCUMENTS

| | | | |
|---|---|---|---|
| 4,015,344 A | 4/1977 | Michaels et al. | 434/257 |
| 5,275,565 A | 1/1994 | Moncrief | 434/29 |
| 5,797,805 A | 8/1998 | Lubell et al. | 473/266 |
| 5,823,786 A | 10/1998 | Easterbrook | 434/247 |
| 5,836,770 A | 11/1998 | Powers | 434/247 |
| 5,947,742 A | 9/1999 | Katayama | 434/247 |

Primary Examiner—John Edmund Rovnak
(74) Attorney, Agent, or Firm—Fellers, Snider, Blankenship, Bailey & Tippens, P.C.

(57) ABSTRACT

A method for the display of video images of exercises including the steps of partitioning the screen into at least two partitions; displaying information comprising text and numbers within one of the partitions; displaying an exercise movement within each of the other partitions wherein the exercise movement displayed in any one of the partitions is different from the exercises movements simultaneously displayed within any of the other partitions and preferably exercises a different muscle group than the other exercise movements so displayed. In one embodiment of the inventive method the exercise movements are displayed for a predetermined interval of time. The time remaining in the interval is displayed in the information partition. Upon expiration of the time interval, new exercise movements are displayed and a new interval time is set. This process repeats in a cyclic fashion for the duration of the video program. The inventive method allows the user to select exercise movements to achieve the results desired by the user and allows the user to vary the workout from day-to-day to reduce boredom and increase motivation.

10 Claims, 3 Drawing Sheets

METHOD OF DISPLAY OF VIDEO IMAGES OF EXERCISES

BACKGROUND OF THE INVENTION

1. Field of the Invention

This invention relates generally to methods of fitness type training. More particularly, but not by way of limitation, the present invention relates to a method for producing an exercise video program which allows the viewer to customize an exercise session while working known muscle groups at a known level.

2. Background

It has long been held that a regimen of regular exercise improves the quality of life at any age and at any level of fitness. Studies have shown that properly designed movements strengthen not only the muscles, but connective tissues and the skeletal system as well. Exercise performed at an aerobic level (traditionally held to be in the range of 60–85% of a person's maximum heart rate) reduces the amount of body fat and cholesterol and improves the efficiency of the cardiovascular system, lowering blood pressure and thereby reducing the risk of heart attack and stroke. In addition, it is well known that regular exercise reduces mental stress and improves mental acuity.

It is no wonder then that a large number of people exercise regularly by joining health clubs, purchasing specialized home fitness equipment, engaging in jogging, walking or bicycling, undertaking recreational activities that provide exercise benefits, and the like. Unfortunately, it is not uncommon for people to undertake an exercise program, only to abandon the program a short time later, usually before any meaningful improvements have been achieved. Often, this is a recurring problem for a particular individual.

There are countless reasons why people drop out of an exercise program. For example, a person may attempt to design his or her own exercise routine and not choose the proper exercises to achieve the desired results, causing the exerciser to become discouraged. Boredom is often cited as a reason why people abandon an exercise routine. This is particularly troublesome with exercise equipment, such as treadmills, stationary bicycles, rowing machines, elliptical steppers, etc. Users often attempt to overcome boredom by activities such as reading a magazine or listening to music while using the machine. Such activities can increase the risk of injury to the exerciser. Finally, some view the act of exercising as work rather than a leisure activity.

Many people prefer to exercise at home rather than at a health club. In particular, the people most in need of an exercise program are also the people most likely to feel uncomfortable at a health club. Unfortunately, the home exerciser is usually not inclined to discuss his or her fitness objectives with a professional trainer, doctor, or physical therapist and is, therefore, likely to spend money on exercise equipment which is ineffective for producing the results desired by the individual. Purchasing ineffective equipment is not only a waste of money, it also leads to discouragement and the subsequent abandonment of the exercise program.

There is, therefore, a need for training material which directs a potential exerciser as to the proper exercises to achieve a desired result; provides instruction for measuring the results of an exercise program; provides instruction for exercising at progressively higher intensities; entertains the exerciser to reduce boredom; appeals to a home user; and does not require an undue investment in specialized equipment.

It is thus an object of the present invention to provide an instructional exercise video which presents instruction and multiple, simultaneous exercise movements such that an exerciser may customize an exercise routine to achieve a desired result while exercising at an intensity appropriate to the condition of the exerciser,

SUMMARY OF THE INVENTION

These and other objects and advantages are achieved in a method for the display of video images of exercises wherein multiple exercise movements are simultaneously shown on a television screen, preferably in a synchronized manner such that an exerciser may choose a series of movements which best suit that person's abilities, desires, and current level of fitness. The instructional video itself is educational, functional and entertaining.

Synchronized, as used herein to describe simultaneous exercise movements, refers to the display of different exercise movements at a common pace, i.e. rate of movement. It is to be understood that each movement is practiced in a cyclic manner and that, while different movements may have a different number of cycle elements, such cycle elements, among simultaneously displayed movements, proceed at the same pace. It should also be understood that not every cycle element may practically be completed in the exactly the same amount of time and thus to proceed at the same pace, all of the time periods of the cycle elements commonly displayed will share a common integer denominator determined by the overall pace.

A video tape produced in one embodiment of the inventive method provides a plurality of images, most preferably three, each image providing a different movement among selected muscle groups, and a timer for measuring the duration of a particular movement, when played on a television monitor.

Music is preferably provided by the viewer so that the viewer sets the pace of the workout with her music selection. The viewer chooses a movement from one shown on the screen and preferably performs that movement for the duration of a timer also displayed on the television screen. Upon expiration of the timer, the viewer preferably chooses a movement from a new group of three movements displayed on the screen and repeats the process for the duration of the tape. By varying the music selection from day-to-day, and choosing different exercise movements from the three movements provided during each interval, the exerciser is given complete control over his or her workout. Preferably instruction is provided as to choosing particular movements appropriate to achieve a desired result and as to an appropriate exercise intensity. A variety of exercise routines may be assembled from the multiple images provided, which will challenge persons of all conditioning levels and reduce or eliminate the boredom that is potentially associated therewith.

While previous video exercise programs are known which offer multiple simultaneous views of the same movement, the inventive method provides simultaneous views of multiple, synchronized exercise movements targeting different muscle groups. The advantage being that the user may construct a large number of different routines from a single video program. The day-to-day variety reduces boredom and increases motivation.

A better understanding of the present invention, its several aspects, and its objects and advantages will become apparent to those skilled in the art from the following detailed description, taken in conjunction with the attached drawings, wherein there is shown and described the preferred embodiment of the invention, simply by way of illustration of the best mode contemplated for carrying out the invention.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation. While the following discussion is directed toward instruction for performing physical training, the invention is not limited to this particular application.

The invention provides a method for displaying multiple images of separate, but related tasks, such that: for a period of time, a user selects and practices a particular task from a plurality of tasks; upon the expiration of the period, the user is directed to select and practice a new task; and the process repeats throughout the duration of the program. This technique has application in diverse fields such as sports training, occupational training, rehabilitation, and the like.

The number of discrete paths through the instructional video program grows exponentially with the number of time periods presented therein. If the number of options presented in each period is represented by X and the number of periods presented in the entire program is n, then the total number of paths, p, which a user may follow is given by:

$$p = X^n$$

Thus, a user may vary the exercise movements selected each time the program is viewed, thereby reducing boredom and increasing the user's motivation. As an example, using the preferred three images (X=3), if 15 one minute intervals are presented in a video program (n=15) then the number of different possible paths a user could follow, p, is 14,348,907.

Figure 3:
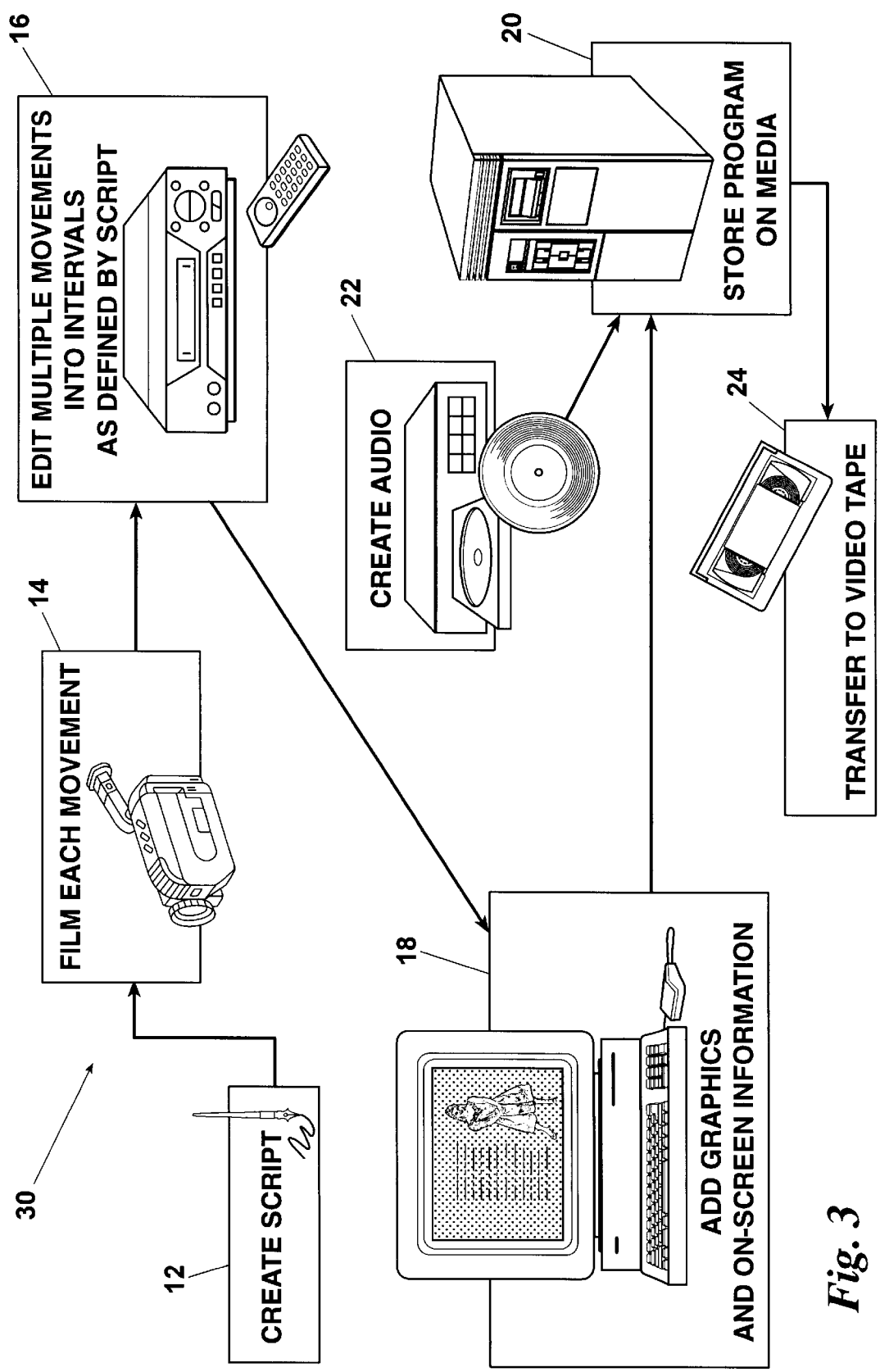
FIG. 3 provides a flow chart for the creation of a video program of exercise movements for storage on a video tape for display in accordance with the inventive method.

FIG. 3 illustrates a preferred method 30 for capturing a video program suitable for use with the inventive method. Beginning at step 12, a script is created for the exercise video program by first dividing the physical workout into a specific number of time intervals. Individual intervals need not be of equal time duration, however, the sum of all of the intervals is roughly equal to the time period for the entire program. Next, a number of specific movements, preferably three, and a pace are chosen for display within each interval. Preferably, movements and pace selected for early intervals are conducive to stretching muscles and warming up so as to reduce the risk of injury during more vigorous intervals. Similarly, movements and pace selected for the final intervals are preferably consistent with traditional methods of cool down. A script for the program is thus created defining the movements, pace, and duration of each time interval.

Typically, within an interval, each of the displayed images feature a movement which targets the exercising of a different muscle group. Generally, as used herein, a muscle group is a muscle or set of muscles which act in concert to produce a particular movement. Common examples of muscle groups include the abdominals, pectorals (chest), deltoids (shoulders), trapezius (upper back), latisimus dorsi (back), biceps, triceps, gluteus, quadriceps, hamstrings, calves and neck.

A muscle group exercise may replicate a movement which is naturally occurring and not a movement specifically invoked for the sake of exercise. Naturally occurring movements include, by way of example and not limitation, walking, jogging, running, stair climbing, squatting, lifting, throwing, swimming, etc. The selection of such movements results in the strengthening of connective tissues and the skeletal system coincident with the strengthening of the muscles of the particular muscle group. This reduces the risk of connective tissue damage when performing everyday activities using a strengthened muscle.

At step 14, a camera is used to record or film each scene consisting of a given movement at a desired pace for at least the desired duration as indicated by the script. After recording all of the individual scenes, conventional video editing equipment is used, at step 16, to combine the scenes such that a plurality of desired movements, preferably three, are shown simultaneously on the screen, in separate partitions, during each interval. Preferably, each movement is synchronized with the other movements contemporaneously displayed to create a pleasing effect for the user and to emphasize a suggested pace.

Next, at step 18, a fourth partition is provided to display information such as time remaining and instructional information. A graphics overlay device is used to provide borders, as desired, around the various partitions, which may be color coded to emphasize suggested routines or identify movements targeted to like muscle groups, to provide background images in the spaces between partitions, and to create the informational display.

During the editing processes of steps 16 and 18, the video program is stored into or onto a medium such as computer memory, magnetic tape, optical storage media, etc (step 20). After assembly of the video program is complete, preferably an audio program is synchronized to the video program at step 22 and likewise stored at 20. Upon complete assembly of the program, including both audio and video portions, the program is transferred to video tape at step 24 for commercial distribution.

While in the preferred embodiment, the program is stored on video tape, the inventive program is not so limited. For example, commercial distribution of the program could be achieved by digital storage as a digital movie file (MPEG, AVI, etc.) on a CD-ROM or a DVD, commercial broadcast from video tape or other source, satellite broadcast, over a cable or closed-circuit television system, over a computer network, or the like. In the text and claims that follow, the term "video" should be used in its broadest sense to include the recording of any sort of animated or human exercise action by any technology presently known (e.g., film, video tape, digital video, etc.) or discovered in the future.

Figure 1:
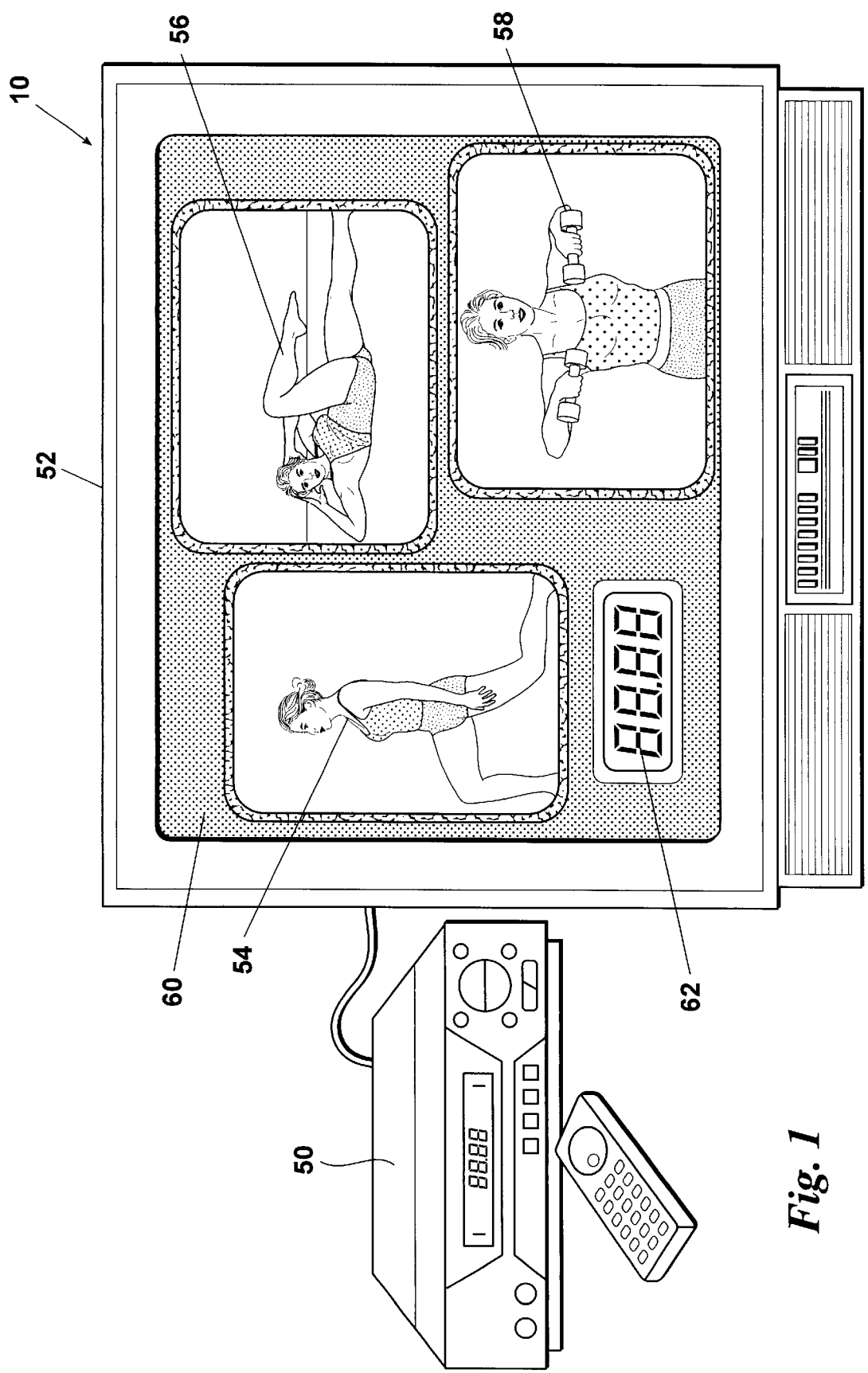
FIG. 1 depicts a television monitor whereon is displayed video images of exercises in accordance with a preferred embodiment of the inventive method.

Referring now to FIG. 1, preferably, when the inventive video program 10 is played back on a suitable player 50 connected to a video monitor 52, the user is simultaneously presented with a plurality of exercise movements 54, 56, and 58 displayed on background 60. Each of the exercise movements preferably targets a different muscle group, and each is demonstrated at a common pace as aforedescribed. The user then selects the movement most desirable and practices that movement until the expiration of the on-screen timer 62. Upon expiration of the timer 62, the user is next presented with a plurality of new movements and a new time period begins. This process repeats for the duration of the video program.

Figure 2:
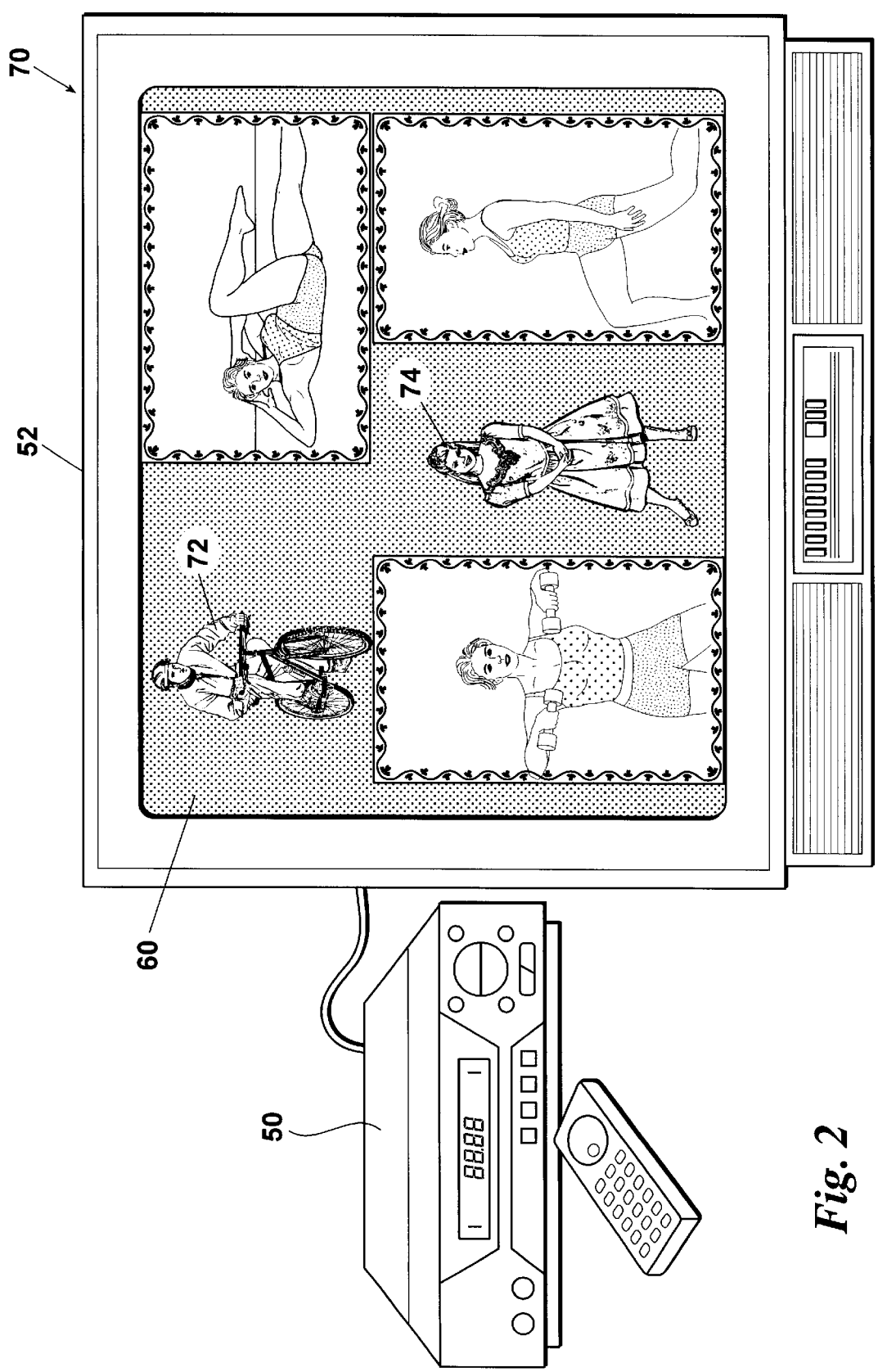
FIG. 2 depicts a television monitor whereon is displayed video images of exercises in accordance with an alternate embodiment of the inventive method.

In another embodiment 70, as depicted in FIG. 2, video images or sequences 72 and 74 which are likely to be appealing or motivational to the user are displayed on background 60.

While the inventive method has been described hereinbefore as incorporating an on-screen informational display as a preferred embodiment, the invention is not so limited. As depicted in FIG. 2, the inventive method may be practiced without numeric or textual instruction, relying instead on visual cues elsewhere in the display or aural cues to alert the user as the exercise movements change.

The user may perform the exercise movements at the pace demonstrated in the video program, at a multiple of the pace, or at a user selected pace. It is suggested that the user provide her or his own music selection while practicing the inventive method. A user may select music which has a tempo which encourages a pace suited to the fitness level of the individual while performing the exercise movements. In addition, it is suggested that the user gather other equipment which may be required for some exercise movements (i.e., a weight, chair or step) prior to starting the video program.

Further, it should be clear to those skilled in the art that although the preferred embodiment involves the fixation of a set of synchronized exercise movements on video tape or other storage medium for subsequent replay, that is not an absolute requirement of the instant invention. For example, it would be possible to broadcast an embodiment of the instant invention that has been constructed "live" by using multiple cameras to capture multiple exercisers who are performing synchronized exercises of different movements. Modem video editing technology being what it is, methods of simultaneously displaying two or more live video signals on a single display device are conventional and well known to those skilled in the art.

What is claimed is:

1. A method for the display of video images of exercises including the steps of:
    (a) partitioning a video screen into at least two partitions; and
    (b) simultaneously displaying a video image of an exercise movement within each of said at least two partitions, wherein each of said at least two displayed exercise movements is different from the other displayed exercise movements and each of said at least two displayed exercise movements targets a particular muscle group different from the muscle groups targeted by the other displayed exercise movements; and
    (c) at predetermined intervals, replacing each said video image with a video image depicting another said exercise movement so as to, over time, provide in each said partition a routine of said exercise movements, whereby a viewer may follow one of said routines or create a custom routine by performing a desired combination of said exercise movements as sequentially demonstrated in said partitions.

2. The method for the display of video images of exercises of claim 1 wherein each of said at least two displayed exercise movements is synchronized in pace with the others.

3. The method for the display of video images of exercises of claim 1 wherein said displayed exercise movements exercise muscle groups taken from a set consisting of abdominals, pectorals, deltoids, trapezius, latisimus dorsi, biceps, triceps, gluteus, quadriceps, hamstrings, calves and neck.

4. An apparatus for storing video images of exercises, comprising:
    a video storage device, said video storage device containing video information implementing the method of claim 1.

5. A device according to claim 4, wherein said video storage device is selected from the group consisting of a video tape, motion picture film, a CD-ROM, a hard disk, computer RAM, computer ROM, and a DVD disk.

6. A method for the display of video images of exercises including the steps of:
    (a) partitioning the screen into at least three partitions;
    (b) displaying information comprising text and numbers within one of said partitions;
    (c) displaying a video image of an exercise movement within each of the other said partitions, wherein each of said exercise movements is different from the others and targets a particular muscle group different from the muscle groups targeted by the others; and
    (d) at predetermined intervals, replacing each said video image with a video image depicting another said exercise movement so as to, over time, provide in each said partition a routine of said exercise movements, whereby a viewer may follow one of said routines or create a custom routine by performing a desired combination of said exercise movements as sequentially demonstrated in said partitions.

7. The method for the display of video images of claim 6 wherein each of said exercise movements displayed within one of said partitions is synchronized in pace with each of the others of said exercise movements simultaneously displayed.

8. The method for the display of video images of claim 6 wherein said information comprises a timer display which displays the time remaining in said predetermined interval of time.

9. The method for the display of video images of exercise of claim 6 wherein said displayed exercise movements exercise muscle groups taken from a set consisting of abdominals, pectorals, deltoids, trapezius, latisimus dorsi, biceps, triceps, gluteus, quadriceps, hamstrings, calves and neck.

10. A method for the display of video images of exercise including the steps of:
    (a) partitioning the screen into at least four non-overlapping regions;
    (b) displaying information including text and numbers within one of said non-overlapping regions;
    (c) displaying a different exercise movement within each of the other said non-overlapping regions,
        wherein each of said exercise movements displayed in any one of said non-overlapping regions exercises a different muscle group than the exercise movement displayed in each of said other non-overlapping regions; and,
    (d) playing an audible instruction,
        wherein said audible instruction provides information to instruct a user as to the results of performing each of said displayed exercise movements.

* * * * *